(12) United States Patent
Liao et al.

(10) Patent No.: US 12,435,079 B2
(45) Date of Patent: Oct. 7, 2025

(54) BRUTON'S TYROSINE KINASE INHIBITORS

(71) Applicant: Xibin Liao, Edison, NJ (US)

(72) Inventors: Xibin Liao, Edison, NJ (US); Yubin Lv, Hangzhou (CN)

(73) Assignee: Xibin Liao, Edison, NJ (US)

( * ) Notice: Subject to any disclaimer, the term of this patent is extended or adjusted under 35 U.S.C. 154(b) by 988 days.

(21) Appl. No.: 17/423,736

(22) PCT Filed: Jan. 17, 2020

(86) PCT No.: PCT/US2020/014214
§ 371 (c)(1),
(2) Date: Jul. 16, 2021

(87) PCT Pub. No.: WO2020/150681
PCT Pub. Date: Jul. 23, 2020

(65) Prior Publication Data
US 2022/0064162 A1    Mar. 3, 2022

Related U.S. Application Data

(60) Provisional application No. 62/794,284, filed on Jan. 18, 2019.

(51) Int. Cl.
*C07D 487/04* (2006.01)
*C07D 471/04* (2006.01)

(52) U.S. Cl.
CPC ......... *C07D 471/04* (2013.01); *C07D 487/04* (2013.01)

(58) Field of Classification Search
None
See application file for complete search history.

(56) References Cited

U.S. PATENT DOCUMENTS

| | | | |
|---|---|---|---|
| 2009/0286768 A1 | 11/2009 | Crew et al. | |
| 2011/0177011 A1 | 7/2011 | Currie et al. | |
| 2017/0008899 A1 | 1/2017 | De Man et al. | |
| 2017/0362243 A1 | 12/2017 | Liu et al. | |
| 2018/0362537 A1 | 12/2018 | Guisot | |

FOREIGN PATENT DOCUMENTS

| | | |
|---|---|---|
| CN | 105362277 A | 3/2016 |
| CN | 108349940 A | 7/2018 |
| WO | WO 2005037836 * | 4/2005 |
| WO | 2013010868 A1 | 1/2013 |
| WO | 2017127371 A1 | 7/2017 |
| WO | 2018175512 A1 | 9/2018 |

OTHER PUBLICATIONS

Black. Journal of Chemical Education, 1990, 67(2), pp. 141-142 (Year: 1990).*
Na Li et al. "Research progress of BTK-targeting cancer chemotherapy" Chinese Journal of New Drugs 2015, 24(3), pp. 298-302 (Feb. 15, 2015).
International Search Report dated Mar. 17, 2020 issued in PTC application No. PCT/US/2020/014214.
Written Opinion of International Search Authority dated Mar. 17, 2020 issued in PTC application No. PCT/US/2020/014214.
Pubchem CID 132232385, pp. 1-9, Create Date: Jan. 29, 2018, p. 2.

* cited by examiner

*Primary Examiner* — Noble E Jarrell
(74) *Attorney, Agent, or Firm* — SZDC Law PC

(57) ABSTRACT

Bruton's tyrosine kinase (BTK) inhibitors have the following Formula (I) or (II):

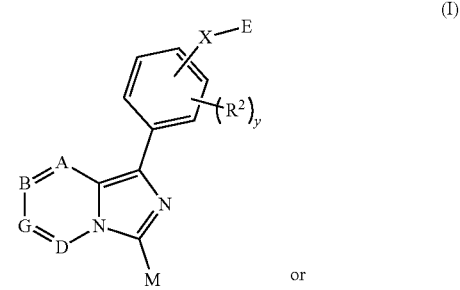

or

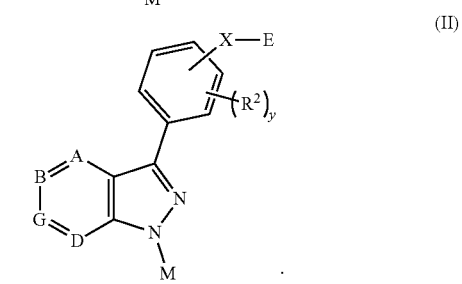

2 Claims, No Drawings

BRUTON'S TYROSINE KINASE INHIBITORS

This application is the National Stage Application of PCT/US2020/014214, filed on Jan. 17, 2020, which claims priority to U.S. Provisional Application No. 62/794,284, filed on Jan. 18, 2019, which is incorporated by reference for all purposes as if fully set forth herein.

FIELD OF THE INVENTION

Described herein are Bruton's tyrosine kinase inhibitors, methods of making such inhibitors, and pharmaceutical compositions containing such inhibitors.

BACKGROUND OF THE INVENTION

Bruton's tyrosine kinase (BTK) plays an important role in signal transduction in B cells and is a factor that contributes to the survival, differentiation, proliferation, and activation of B cells. There is currently a need for methods of treating diseases in which B cells or mast cells participate. BTK is also known to participate in mast cell activation and in the physiological functions of platelets. Therefore, BTK inhibitors are effective for the treatment of diseases in which B cells or mast cells participate, for example, allergic diseases, autoimmune diseases, inflammatory diseases, thromboembolic diseases, and cancers.

SUMMARY OF THE INVENTION

In one aspect, the present invention discloses a compound of Formula (I), (II) having the following structure, an isomer thereof, a tautomer thereof, a pharmaceutical acceptable solvate thereof, or a pharmaceutical acceptable prodrug thereof:

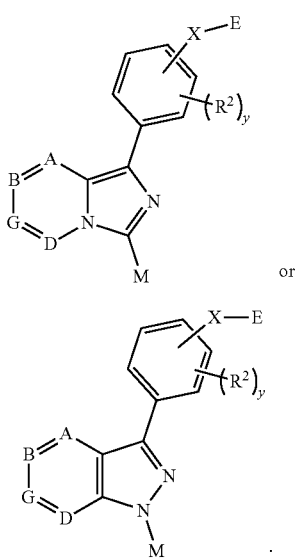

A, B, G, and D are each independently N or $CR^1$, with the proviso that only one or two of A, B, G, and D can be N; $R^1$ is hydrogen, alkyl, —$OR^{1A}$, amino, —OH, —CN, —NHOH, —$NR^{1A}R^{1B}$, or —$CONH_2$; $R^2$ is independently hydrogen, halogen, —$CZ_3$, —$CHZ_2$, —$CH_2Z$, —$OCZ_3$, —$OCH_2Z$, —$OCHZ_2$, —CN, —$SONNR^{2A}R^{2B}$, —NHC(O) $NR^{2A}R^{2B}$, —$N(O)_n$, —$NR^{2A}R^{2B}$, —C(O) $R^{2A}$, —C(O)—$OR^{2A}$, —C(O)$NR^{2A}R^{2B}$, —$SO_nR^{2A}$, —$OR^{2A}$, —$NR^{2C}SO_2R^{2B}$, —$NR^{2C}C(O)R^{2A}$, —$NR^{2C}C(O)OR^{2A}$, —$NR^{2A}OR^{2B}$, substituted or unsubstituted alkyl, optionally substituted with one to five fluorines substituted or unsubstituted heteroalkyl, optionally substituted with one to five fluorines substituted or unsubstituted cycloalkyl, optionally substituted with one to five fluorines; substituted or unsubstituted heterocycloalkyl, optionally substituted with one to five fluorines, substituted or unsubstituted aryl, or substituted or unsubstituted heteroaryl, wherein two adjacent $R^2$ substituents may optionally be joined to form a substituted or unsubstituted cycloalkyl, substituted or unsubstituted heterocycloalkyl, substituted or unsubstituted aryl, or substituted or unsubstituted heteroaryl, and y is an integer from 0 to 5; M is substituted or unsubstituted $C_{1-6}$ alkyl, substituted or unsubstituted $C_{3-10}$ cycloalkyl, substituted or unsubstituted $C_{3-10}$ cycloalkenyl, substituted or unsubstituted 3 to 10 membered heterocycloalkyl, substituted or unsubstituted 3 to 10 membered heterocycloalkenyl and 5 to 10 membered heteroaryl, wherein, when substituted, M contains from 1 to 9 substituents independently selected at each occurrence from the group consisting of halo, —$OR^{2A}$, —$NR^{2A}R^{2B}$, —O, —CN, —C(O) $OR^{2A}$, —OC(O)$R^{2A}$, —C(O)$NR^{2A}R^{2B}$, —$NR^{2C}C(O)R^{2A}$, $C_{1-6}$ alkyl, $C_{1-6}$ haloalkyl, $C_{1-6}$ alkyl substituted with —$OR^{2A}$, optionally substituted with one to five fluorines $C_{3-8}$ cycloalkyl, —$SO_2R^{2A}$, $SO_3R^{2A}$, $C(O)R^{2A}$ and a 3 to 8 membered heterocyclic group; —X-E is one of the followings: (1) X is O, —$OCR^{2A}R^{2B}$—, —$CR^{2A}R^{2B}O$—, —S(O)—, —$S(O)_2$—, —$CR^{2A}R^{2B}$—, —$CR^{2A}R^{2B}NR^{2C}$ (C=O)—, —$CR^{2A}R^{2B}$ (C=O)$NR^{2C}$—, —(C=O) $NR^{2C}CR^{2A}R^{2B}$—, —$NR^{2C}$(C=O)$CR^{2A}R^{2B}$—, or a bond; and E is a hydrogen, an aryl or a heteroaryl substituted with one to five $R^3$ substituents; or a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 4-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or (2) —X-E is hydrogen, halogen, —$OR^{2A}$, —$O(CH_2)_{1-4}R^{2A}$, —CN, —$NO_2$; $R^{1A}$, $R^{1B}$, $R^{2A}$, $R^{2B}$ and $R^{2C}$ are each independently hydrogen, —$CZ_3$, —CN, —COOH, —$CONH_2$, —$CHZ_2$, —$CH_2Z$, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl, wherein $R^{1A}$ and $R^{1B}$ substituents bonded to the same nitrogen atom may optionally be joined to form a substituted or unsubstituted heterocycloalkyl or substituted or unsubstituted heteroaryl, and $R^{2A}$ and $R^{2B}$ substituents bonded to the same nitrogen atom may optionally be joined to form a substituted or unsubstituted heterocycloalkyl or substituted or unsubstituted heteroaryl; Z is independently —F, —Cl, —Br or —I; and n is independently an integer from 1 to 2.

In another aspect, M is

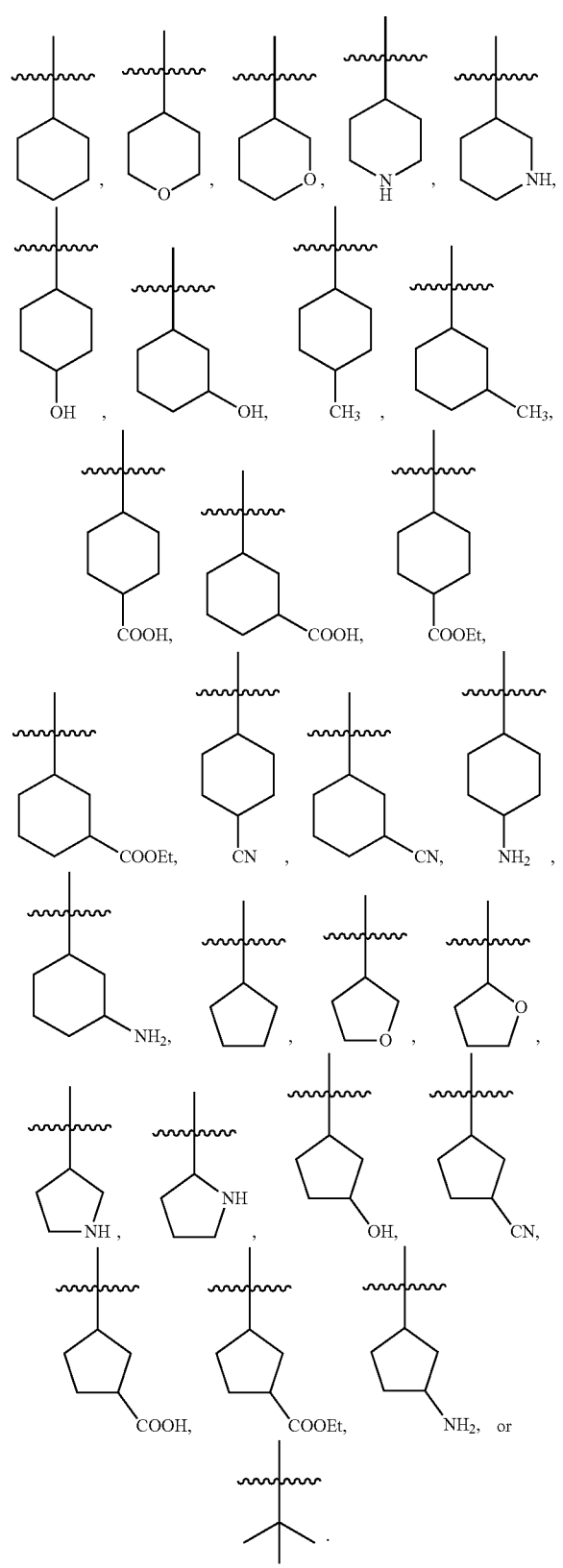

In another aspect, X is —O—, —NH—CO—, —CO—NH₂—, —CH₂—NH—CO—, or —NH—CO—CH₂—; and E is In another aspect, $R^2$ is H, F, Cl, OCH$_3$, CH$_3$, and y is 1 or 2.

In another aspect, A is $CR^1$, and one of B, G, and D is N.

In another aspect, A is C—H or C—NH$_2$.

In another aspect, B is N, and G and D are C—H.

In another aspect, B is N, G is C—H, and D is $CR^1$.

In another aspect, D is C—H, C—OCH$_3$, C—OCH$_2$CH$_3$, C—OCH$_2$CH$_2$CH$_3$, C—OCH(CH$_3$)$_2$, C—OCH$_2$CH$_2$CH$_2$CH$_3$, C—OCH$_2$CF$_3$, C—OCH$_2$CH$_2$CF$_3$,

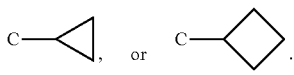

In another aspect, the compound is selected from the group consisting of 3-[8-Amino-1-(4-phenoxy-phenyl)-imidazo[1,5-a]pyrazin-3-yl]-cyclohexanol; 4-{8-Amino-1-[4-(2-fluoro-3-methoxy-phenoxy)-phenyl]-imidazo[1,5-a]pyrazin-3-yl}-cyclohexanol; N-{4-[1-(3-Hydroxy-cyclohexyl)-1H-pyrazolo[4,3-c]pyridin-3-yl]-benzyl}-2-methoxy-benzamide; (3-{8-Amino-1-[4-(2-fluoro-3-methoxy-phenoxy)-phenyl]-imidazo[1,5-a]pyrazin-3-yl}-cyclohexanol; 4-[8-Amino-1-(4-phenoxy-phenyl)-imidazo[1,5-a]pyrazin-3-yl]-cyclohexanol; 4-{8-Amino-1-[4-(3-chloro-2-fluoro-phenoxy)-phenyl]-imidazo[1,5-a]pyrazin-3-yl}-cyclohexanol; 4-{8-Amino-1-[4-(3-chloro-phenoxy)-phenyl]-imidazo[1,5-a]pyrazin-3-yl}-cyclohexanol; 4-[8-Amino-1-(4-m-tolyloxy-phenyl)-imidazo[1,5-a]pyrazin-3-yl]-cyclohexanol; 4-{8-Amino-1-[4-(3-methoxy-2-methyl-phenoxy)-phenyl]-imidazo[1,5-a]pyrazin-3-yl}-cyclohexanol; N-{4-[1-(4-Hydroxy-cyclohexyl)-1H-pyrazolo[4,3-c]pyridin-3-yl]-benzyl}-2-methoxy-benzamide; N-{4-[8-Amino-3-(4-hydroxy-cyclohexyl)-imidazo[1,5-a]pyrazin-1-yl]-benzyl}-2-methoxy-benzamide; N-{4-[8-Amino-3-(3-hydroxy-cyclohexyl)-imidazo[1,5-a]pyrazin-1-yl]-benzyl}-2-methoxy-benzamide; N-[4-(8-Amino-3-cyclopentyl-imidazo[1,5-a]pyrazin-1-yl)-benzyl]-2-methoxy-benzamide; N-[4-(1-Cyclopentyl-1H-pyrazolo[4,3-c]pyridin-3-yl)-benzyl]-2-methoxy-benzamide; 3-[4-Amino-7-methoxy-3-(4-phenoxy-phenyl)-pyrazolo[4,3-c]pyridin-1-yl]-cyclohexanol; 4-[4-Amino-7-methoxy-3-(4-phenoxy-phenyl)-pyrazolo[4,3-c]pyridin-1-yl]-cyclohexanol; 3-{4-Amino-3-[4-(2-fluoro-3-methoxy-phenoxy)-phenyl]-7-methoxy-pyrazolo[4,3-c]pyridin-1-yl}-cyclohexanol; 4-{4-Amino-3-[4-(2-fluoro-3-methoxy-phenoxy)-phenyl]-7-methoxy-pyrazolo[4,3-c]pyridin-1-yl}-cyclohexanol; 1-Cyclopentyl-7-methoxy-3-(4-phenoxy-phenyl)-1H-pyrazolo[4,3-c]pyridin-4-ylamine; 3-{8-Amino-5-ethoxy-1-[4-(2-fluoro-3-methoxy-phenoxy)-phenyl]-imidazo[1,5-a]pyrazin-3-yl}-cyclohexanol; 4-{8-Amino-5-ethoxy-1-[4-(2-fluoro-3-methoxy-phenoxy)-phenyl]-imidazo[1,5-a]pyrazin-3-yl}-cyclohexanol; 4-[8-Amino-5-ethoxy-1-(4-phenoxy-phenyl)-imidazo[1,5-a]pyrazin-3-yl]-cyclohexanol; 3-Cyclohexyl-5-ethoxy-1-(4-phenoxy-phenyl)-imidazo[1,5-a]pyrazin-8-ylamine; 3-Cyclopentyl-5-ethoxy-1-[4-(2-fluoro-3-methoxy-phenoxy)-phenyl]-imidazo[1,5-a]pyrazin-8-ylamine; N-{4-[8-Amino-5-ethoxy-3-(4-hydroxy-cyclohexyl)-imidazo[1,5-a]pyrazin-1-yl]-benzyl}-2-methoxy-benzamide; N-[4-(8-Amino-3-cyclohexyl-5-ethoxy-imidazo[1,5-a]pyrazin-1-yl)-benzyl]-2-methoxy-benzamide; N-[4-(8-Amino-3-cyclopentyl-5-ethoxy-imidazo[1,5-a]pyrazin-1-yl)-benzyl]-2-methoxy-benzamide; 5-Ethoxy-1-(4-phenoxy-phenyl)-3-(tetrahydro-pyran-4-yl)-imidazo[1,5-a]pyrazin-8-ylamine; 3-[8-Amino-1-(4-phenoxy-phenyl)-imidazo[1,5-a]pyrazin-3-yl]-cyclohexanecarboxylic acid; 4-(8-Amino-1-{4-[(2-methoxy-benzoylamino)-methyl]-phenyl}-imidazo[1,5-a]pyrazin-3-yl)-cyclohexanecarboxylic acid ethyl ester; and N-{4-[8-Amino-3-(4-methoxy-cyclohexyl)-imidazo[1,5-a]pyrazin-1-yl]-benzyl}-2-methoxy-benzamide.

DETAILED DESCRIPTION OF THE INVENTION

The methods described herein include administering to a subject in need a composition containing a therapeutically effective amount of one or more BTK inhibitor compounds described herein.

Prodrugs means any compound which releases an active parent drug according to Formula (I) or (II) in vivo when such prodrug is administered to a mammalian subject. Prodrugs of a compound of Formula I or (II) are prepared by modifying functional groups present in the compound of Formula I or (II) in such a way that the modifications may be cleaved in vivo to release the parent compound. Prodrugs may be prepared by modifying functional groups present in the compounds in such a way that the modifications are cleaved, either in routine manipulation or in vivo, to the parent compounds.

Tautomers mean compounds produced by the phenomenon wherein a proton of one atom of a molecule shifts to another atom. Tautomers also refer to one of two or more structural isomers that exist in equilibrium and are readily converted from one isomeric form to another. One of ordinary skill in the art would recognize that other tautomeric ring atom arrangements are possible. All such isomeric forms of these compounds are expressly included in the present disclosure.

Isomers mean compounds having identical molecular formulae but differ in the nature or sequence of bonding of their atoms or in the arrangement of their atoms in space. Isomers that differ in the arrangement of their atoms in space are termed stereoisomers. Stereoisomers that are not mirror images of one another are termed diastereomers, and those that are non-superimposable mirror images of each other are termed enantiomers. When a compound has an asymmetric center, for example, it is bonded to four different groups, a pair of enantiomers is possible. A chiral compound can exist as either individual enantiomer or as a mixture thereof. Unless otherwise indicated, the description is intended to include individual stereoisomers as well as mixtures.

Certain compounds of the present disclosure can exist in unsolvated forms as well as solvated forms, including hydrated forms. Solvates refer to a complex formed by combination of solvent molecules with the compound of Formula I or (II). The solvent can be an organic compound, an inorganic compound, or a mixture thereof.

Pharmaceutically acceptable salts represent those salts which are, within the scope of medical judgement, suitable for use in contact for the tissues of humans and lower animals without undue toxicity, irritation, allergic response and the like, and are commensurate with a reasonable benefit/risk ratio. They may be obtained during the final isolation and purification of the compounds of the invention, or separately by reacting the free base function with a suitable mineral acid such as hydrochloric acid, phosphoric acid, or sulfuric acid, or with an organic acid such as for example ascorbic acid, citric acid, tartaric acid, lactic acid, maleic acid, malonic acid, fumaric acid, glycolic acid, succinic acid, propionic acid, acetic acid, methanesulfonic acid, and the like. The acid function can be reacted with an organic or a mineral base, like sodium hydroxide, potassium hydroxide or lithium hydroxide.

Therapeutically effective amount means an amount of compound or a composition of the present invention effective in inhibiting Bruton's tyrosine kinase and thus producing the desired therapeutic effect.

As used herein, the term alkyl refers to a monovalent straight or branched chain, saturated aliphatic hydrocarbon radical having a number of carbon atoms in the specified range. For example, $C_{1-6}$ alkyl refers to any of the hexyl alkyl and pentyl alkyl isomers as well as n-, iso-, sec- and t-butyl, n- and iso-propyl, ethyl and methyl. Alkyl also includes saturated aliphatic hydrocarbon radicals wherein one or more hydrogens are replaced with deuterium, for example, $CD_3$.

The term branched alkyl refers to an alkyl group as defined above except that straight chain alkyl groups in the specified range are excluded. As defined herein, branched alkyl includes alkyl groups in which the alkyl is attached to the rest of the compound via a secondary or tertiary carbon. For example, isopropyl is a branched alkyl group.

The term cycloalkyl refers to any monocyclic ring of an alkane having a number of carbon atoms in the specified range. For example, $C_{3-6}$cycloalkyl refers to cyclopropyl, cyclobutyl, cyclopentyl, and cyclohexyl.

The term halogen refers to fluorine, chlorine, bromine and iodine (alternatively referred to as fluoro, chloro, bromo, and iodo).

The term haloalkyl refers to an alkyl group as defined above in which one or more of the hydrogen atoms have been replaced with a halogen (i.e., F, Cl, Br and/or I). For example, $C_{1-6}$ haloalkyl refers to a $C_1$ to $C_6$ linear or branched alkyl group as defined above with one or more halogen substituents. The term fluoroalkyl has an analogous meaning except that the halogen substituents are restricted to fluoro. Suitable fluoroalkyls include the series $(CH_2)_{0-4}CF_3$.

The term C(O) or CO refers to carbonyl. The terms $S(O)_2$ or $SO_2$ refers to sulfonyl. The term S(O) or SO refers to sulfinyl.

The term aryl refers to phenyl, naphthyl, tetrahydronaphthyl, idenyl, dihydroindenyl and the like. An aryl of particular interest is phenyl.

The term heteroaryl refers to (i) a 5- or 6-membered heteroaromatic ring containing from 1 to 4 heteroatoms independently selected from N, O and S, or (ii) is a heterobicyclic ring selected from quinolinyl, isoquinolinyl, and quinoxalinyl. Suitable 5- and 6-membered heteroaromatic rings include, for example, pyridyl (also referred to as pyridinyl), pyrrolyl, pyrazinyl, pyrimidinyl, pyridazinyl, triazinyl, thienyl, furanyl, imidazolyl, pyrazolyl, triazolyl, tetrazolyl, oxazolyl, isooxazolyl, oxadiazolyl, oxatriazolyl, thiazolyl, isothiazolyl, and thiadiazolyl. A class of heteroaryls of interest consists of (i) 5- and 6-membered heteroaromatic rings containing from 1 to 3 heteroatoms independently selected from N, O and S, and (ii) heterobicyclic rings selected from quinolinyl, isoquinolinyl, and quinoxalinyl. Heteroaryls of particular interest are pyrrolyl, imidazolyl, pyridyl, pyrazinyl, quinolinyl (or quinolyl), isoquinolinyl (or isoquinolyl), and quinoxalinyl.

Examples of 4- to 7-membered, saturated heterocyclic rings within the scope of this invention include, for example, azetidinyl, piperidinyl, morpholinyl, thiomorpholinyl, thiazolidinyl, isothiazolidinyl, oxazolidinyl, isoxazolidinyl, pyrrolidinyl, imidazolidinyl, piperazinyl, tetrahydrofuranyl, tetrahydrothienyl, pyrazolidinyl, hexahydropyrimidinyl, thiazinanyl, thiazepanyl, azepanyl, diazepanyl, tetrahydropyranyl, tetrahydrothiopyranyl, and dioxanyl. Examples of 4- to 7-membered, unsaturated heterocyclic rings within the scope of this invention include mono-unsaturated heterocyclic rings corresponding to the saturated heterocyclic rings listed in the preceding sentence in which a single bond is replaced with a double bond (e.g., a carbon-carbon single bond is replaced with a carbon-carbon double bond).

It is understood that the specific rings listed above are not a limitation on the rings which can be used in the present invention. These rings are merely representative.

Synthetic methods for preparing the compounds of the present invention are illustrated in the following Schemes, Methods, and Examples. Starting materials are commercially available or may be prepared according to procedures known in the art or as described herein. The compounds of the invention are illustrated by means of the specific examples shown below. However, these specific examples are not to be construed as forming the only genus that is considered as the invention. These examples further illustrate details for the preparation of the compounds of the present invention. Those skilled in the art will readily appreciate that known variations in the conditions Band processes can be used to prepare such compounds.

Irreversible and reversible BTK inhibitors target cysteine residue C481 of BTK. Following treatment with ibrutinib, drug resistance in some patients has emerged. Mutations within BTK, for example, C481S, C481Y, C481R, C481F, have been reported. The resistance will increase as clinical use outside clinical trials expands over time.

The present invention provides BTK inhibitor compounds of Formula (I), (II) that may have a different binding mode. Specifically, the BTK inhibitor compounds of Formula (I), (II) have good activity against BTK but can be also effective against BTK mutations. For example, these compounds can be effective against the C481 BTK mutations.

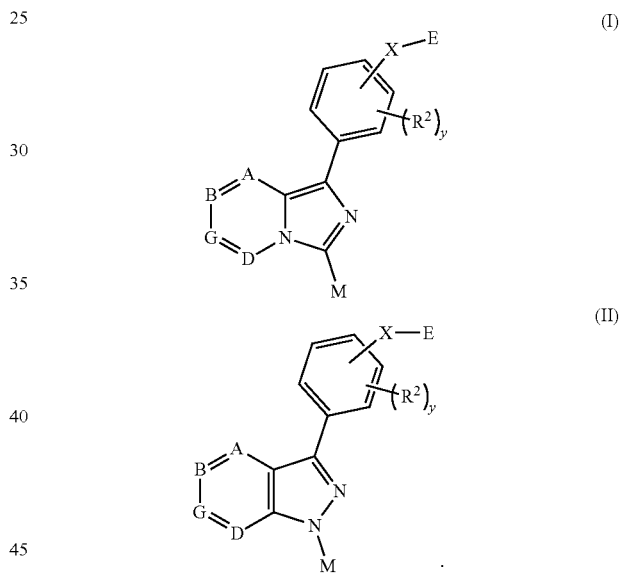

The BTK inhibitor compounds of Formula (I) or (II) can be prepared by methods well known in the art of organic chemistry. The starting material used for the synthesis of these compounds can be either synthesized or obtained from commercial sources, such as, but not limited to, China chemical companies or Sigma-Aldrich Chemical Co. (St. Louis, Mo.) at China. The compounds described herein, and other related compounds having different substituents are optionally synthesized using techniques and materials, such as described, for example, in March, ADVANCED ORGANIC CHEMISTRY 4th Ed., (Wiley 1992); Carey and Sundberg, ADVANCED ORGANIC CHEMISTRY 4th Ed., Vols. A and B (Plenum 2000, 2001); Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); and Larock's Comprehensive Organic Transformations (VCH Publishers Inc., 1989). Other methods for the synthesis of compounds described herein may be found in international Application Publication No. WO 2013/010868 A1, Liu, J. et al. ACS Medicinal Chemistry Letters 10 (2016) 198-203. The definitions of chemistry terms used in this application may be found in these reference (if not otherwise defined herein). As a guide the following synthetic methods may be utilized.

During the synthetic sequences, it may be necessary and/or desirable to protect sensitive or reactive groups on any of the molecules concerned. This is achieved by means of conventional protecting groups, such as those described in T. W Greene and P. G. M. Wutts "Protective groups in Organic Synthesis" 3rd Edition, John Wiley and Sons, 1999. The protective groups are optionally removed at a convenient subsequent stage using methods well known in the art. The products of the reactions are optionally isolated and purified. If desired, using conventional techniques, but not limited to, filtration, distillation crystallization, chromatography and the like. Such materials are optionally characterized using conventional means, including physical constant and spectra data.

Compounds described herein may possess one or more sterocenters and each center may exist in the R or S configuration. The compounds presented herein include all diasterometic, enantiomeric, and epimeric forms as well as the appropriate mixtures thereof.

The BTK inhibitor compounds of Formula I can be, for example, imidazo[1,5-a]pyrazine derivatives. Specifically, the BTK inhibitor compounds of Formula (I) can be, for example, compounds E or G, wherein A, B, D, G and M have the previously defined meanings and R is

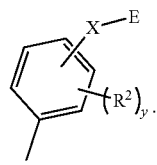

A non-limiting example of a synthetic approach towards the preparation of compounds E and G can be prepared by the general synthetic route shown in Scheme I.

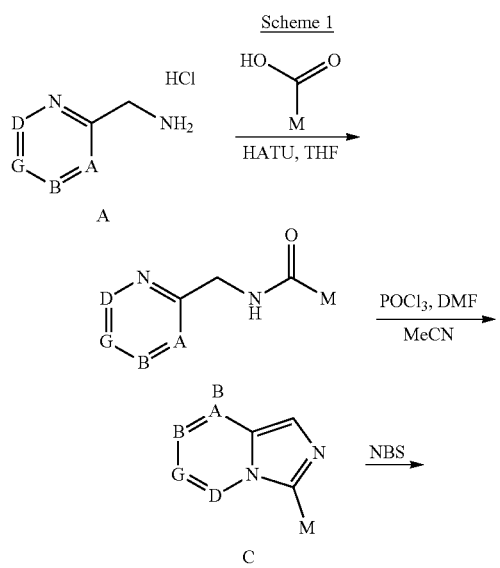

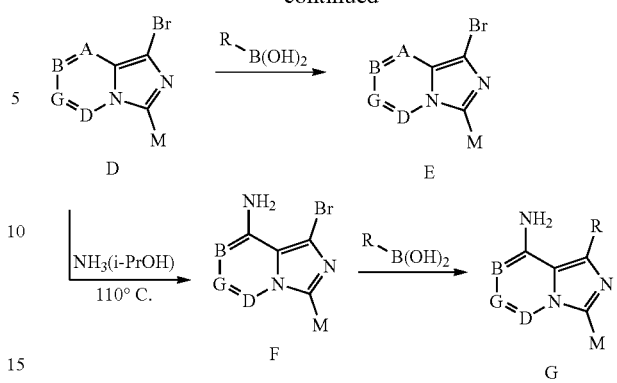

Referring to Scheme I, different amines (A) can be obtained by hydrogenation of aromatic nitrile, and then can be reacted with an appropriately amine protected amino acid in a solvent such as DMF, THF or DCM in the presence of a base such as TEA, DIPEA, DMAP and with different coupling reagents such as PyBOP, TBTU, EDCI or HATU to form intermediate B. Cyclization B can be used the condensation reagents like POCl$_3$ under heating conditions to provide the key intermediate C, subsequent bromination can be achieved using bromine or N-bromosussinimide in a solvent like DCM or DMF at appropriate temperature to obtain compounds of D, then react with appropriately substituted phenylboronic acid (corresponding boronic esters may also be used) directly affords the desired compounds E. If A is C—Cl of compounds of D, then it can be converted to compound F under a condition of NH$_3$ in i-PrOH at 110° C., following the coupling with appropriately substituted phenylboronic acid (corresponding boronic esters may also be used) directly affords the desired compounds G.

The BTK inhibitor compounds of Formula (II) can be, for example, compounds J, wherein A, B, D, G and M have the previously defined meanings and R is

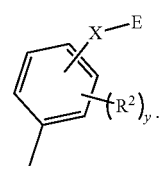

A non-limiting example of a synthetic approach towards the preparation of compounds J can be prepared by the general synthetic route shown in Scheme II.

Scheme II below shows a general synthetic route that is used for preparing the compound J of this invention. Intermediate H can be obtained by methods substantially similar to those described in International Patent Publication No. WO 2017127371. Coupling reaction of the 1-nitrogen on the indazole with MOH via Mitsunobu reaction or with MOTs via replacement to give the intermediate I, which then are derivative by metal catalyst coupling reaction using appropriately substituted phenylboronic acid (corresponding boronic esters may also be used) affords the desired compounds J.

Scheme II

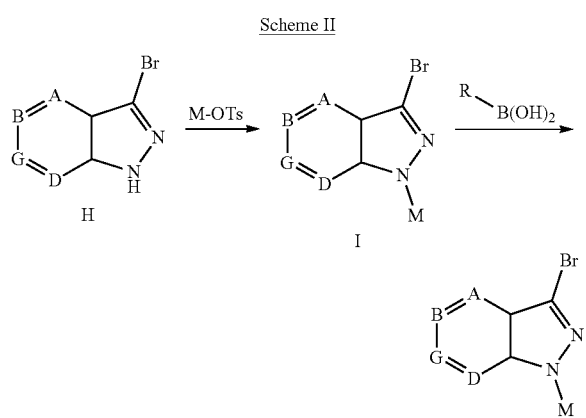

The present invention also embraces isotopically-labelled compounds of the present invention which are identical to those recited herein, but for the fact that one or more atoms are replaced by an atom having an atomic mass or mass number different from the atomic mass or number usually found in nature. Examples of isotopes that can be incorporated into compounds of the invention include isotopes of hydrogen, carbon, nitrogen, oxygen, phosphorus, fluorine and chlorine, such as $^2H$, $^3H$, $^{13}C$, $^{14}C$, $^{15}N$, $^{17}O$, $^{18}O$, $^{31}P$, $^{32}P$, $^{35}S$, $^{18}F$, and $^{36}Cl$ respectively.

Certain isotopically-labelled compounds of Formula (I) or (II) (e.g. those labeled with $^3H$ and $^{14}C$) are useful in compound and/or substrate tissue distribution assays. Tritiated and carbon-14 isotopes are particularly preferred for their ease of preparation and detectability. Further, substitution with heavier isotopes such as deuterium may afford certain therapeutic advantages resulting from greater metabolic stability (e.g., increased in vivo half-life or reduced dosage requirements) and hence may be preferred in some circumstances. Isotopically labelled compounds of Formula I can generally be prepared by following procedures analogous to those disclosed in the schemes and/or in the examples herein below, by substituting and appropriate isotopically labeled reagent for a non-isotopically labeled reagent.

General experimental conditions: Preparative thin layer chromatography (Prep-TLC) was performed on 20×20 cm plates (500 micron thick silica gel). Silica gel chromatography was performed on a Biotage Horizon flash chromatography system. 1H NMR spectra were recorded on a Bruker Ascend™ 400 spectrometer at 400 MHz at 298° K, and the chemical shifts are given in parts per million (ppm) referenced to the residual proton signal of the deuterated solvents: CHCl$_3$ at δ=7.26 ppm and CH$_3$OH or CH$_3$OD at δ=3.30 ppm. LCMS spectra were taken on an Agilent Technologies 1260 Infinity or 6120 Quadrupole spectrometer. The mobile phase for the LC was acetonitrile (A) and water (B) with 0.01% formic acid, and the eluent gradient was from 5-95% A in 6.0 min, 60-95% A in 5.0 min, 80-100% A in 5.0 min and 85-100% A in 10 min using a SBC18 50 mm×4.6 mm×2.7 μm capillary column. Mass spectra (MS) were measured by electrospray ion-mass spectroscopy (ESI). All temperatures are in degrees Celsius unless otherwise noted.

Analytical HPLC Mass Spectrometry Conditions:

LC1: Column: SB-C18 50 mm×4.6 mm×2.7 μm; Temperature: 50° C.; Eluent: 5:95 v/v acetonitrile/water+0.01% formic acid in 6 min; Flow Rate: 1.5 mL/min, Injection 5 μL; Detection: PDA, 200-600 nm; MS: mass range 150-750 amu; positive ion electrospray ionization.

LC2: Column: SB-C18 50 mm×4.6 mm×2.7 μm; Temperature: 50° C.; Eluent: 5:95 to 95:5 v/v acetonitrile/water+0.05% TFA over 3.00 min; Flow Rate: 1.5 mL/min, Injection 5 μL; Detection: PDA, 200-600 nm; MS: mass range 150-750 amu; positive ion electrospray ionization.

LC3: Column: SB-C18 50 mm×4.6 mm×2.7 μm; Temperature: 50° C.; Eluent: 10:90 to 98:2 v/v acetonitrile/water+0.05% TFA over 3.75 min; Flow Rate: 1.0 mL/min, Injection 10 μL; Detection: PDA, 200-600 nm; MS: mass range 150-750 amu; positive ion electrospray ionization.

List of Abbreviations:

AcOH=acetic acid; Alk=alkyl; Ar=aryl; Boc=tert-butyloxycarbonyl; bs=broad singlet; CH$_2$Cl$_2$=dichloromethane; d=doublet; dd=doublet of doublets; DBU=1,8-diazabicyclo[5.4.0]undec-7-ene; DCM=dichloromethane; DEAD=diethyl azodicarboxylate; DMF=N,N-dimethylformamide; DMSO=dimethyl sulfoxide; EA=ethyl acetate; ESI=electrospray ionization; Et=ethyl; EtOAc=ethyl acetate; EtOH=ethyl alcohol; h=hours; HOAc=acetic acid; LiOH=lithium hydroxide; m=multiplet; Me=methyl; MeCN=acetonitrile; MeOH=methyl alcohol; MgSO4=magnesium sulfate; min=minutes; MS=mass spectroscopy; NaCl=sodium chloride; NaOH=sodium hydroxide; Na$_2$SO$_4$=sodium sulfate; NMR=nuclear magnetic resonance spectroscopy; PE=petroleum ether; PG=protecting group; Ph=phenyl; rt=room temperature; s=singlet; t=triplet; TFA=trifluoroacetic acid; THF=tetrahydrofuran; Ts=p-toluenesulfonyl (tosyl).

The compounds of the present invention can be prepared following general methods detailed below. In certain embodiments, provided herein are methods of making the tyrosine kinase inhibitor compounds described herein. In certain embodiments, compounds described herein are synthesized using the following synthetic schemes. In other embodiments, compounds are synthesized using methodologies analogous to those described below by the use of appropriate alterative starting materials. All key intermediates were prepared according to the following methods.

Example 1

3-[8-Amino-1-(4-phenoxy-phenyl)-imidazo[1,5-a]pyrazin-3-yl]-cyclohexanol

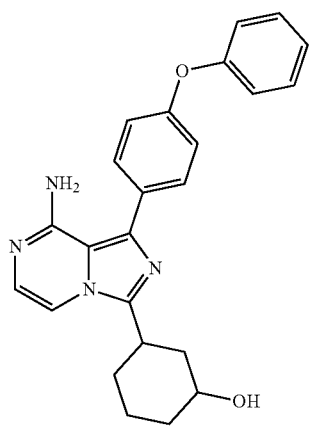 [SMILES: Nc1nccn2c(C3CCCC(O)C3)nc(-c3ccc(Oc4ccccc4)cc3)c12]

Reaction Scheme

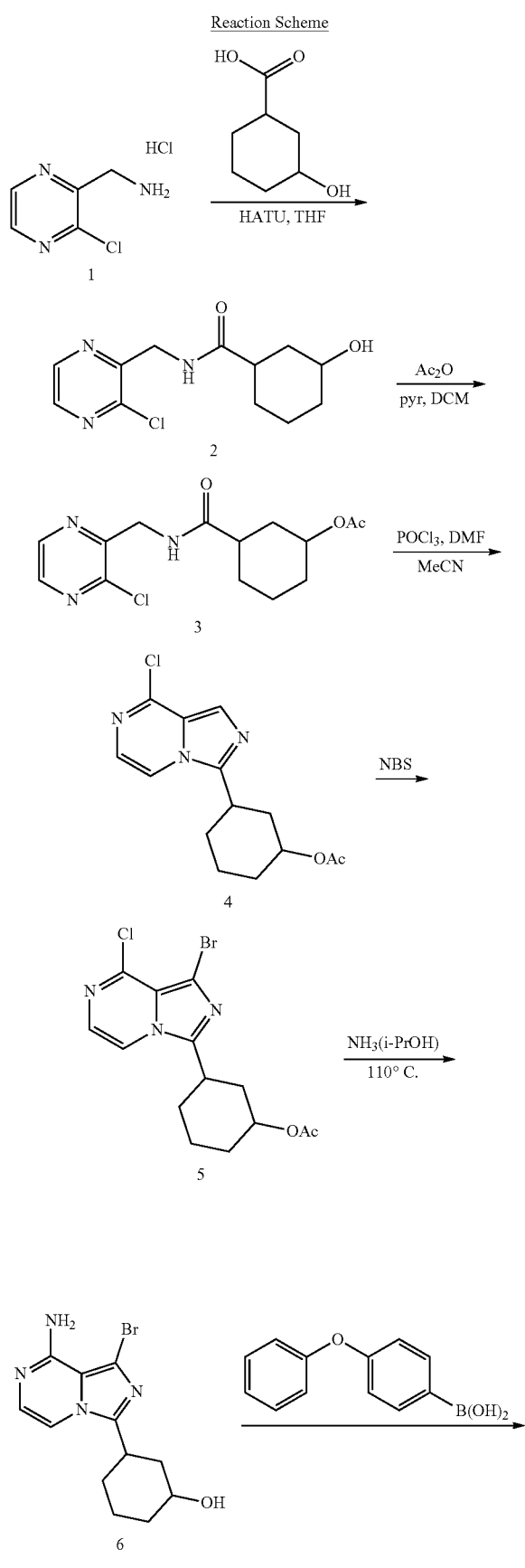

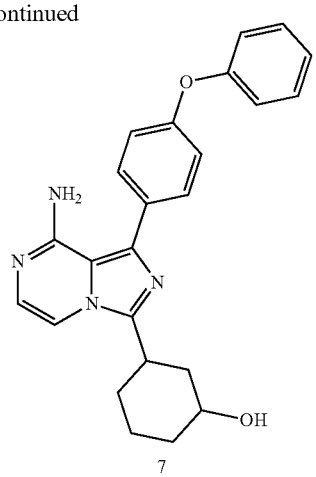

Step 1: N-((3-chloropyrazin-2-yl)methyl)-3-hydroxycyclohexanecarboxamide (2)

To a mixture of (3-chloropyrazin-2-yl) methanamine hydrochloride (1) (1.25 g, 6.94 mmol) and 3-hydroxycyclohexanecarboxylic acid (1 g, 6.94 mmol) in DCM (20 mL) was added TEA (2.8 g, 27.76 mmol) and HATU (3.2 g, 8.32 mmol) and stirred for 1 h at room temperature. The reaction mixture was poured into water, extracted with EA. The organic phase was washed with brine, dried over $Na_2SO_4$, filtered, and the filtrate was concentrated. The residue was purified by chromatography column (DCM/MeOH=30/1) to give 2 (410 mg, 21.9%). 1H NMR (400 MHz, $CDCl_3$): δ 8.45 (s, 1H), 8.33 (s, 1H), 6.83 (br, 1H), 4.69 (d, J=4.4 Hz, 2H), 2.71-2.78 (m, 1H), 1.69-1.95 (m, 5H), 1.60-1.65 (m, 2H), 1.25-1.40 (m, 3H); Chemical Formula: $C_{12}H_{16}ClN_3O_2$; Molecular Weight: 269.73; LCMS: (ES+): m/z 270.1 $[M+1]^+$, $t_R$=1.36 min.

Step 2: 3-(((3-chloropyrazin-2-yl)methyl)carbamoyl)cyclohexyl acetate (3)

A mixture of 2 (360 mg, 1.33 mmol) and $Ac_2O$ (2.7 g, 26.60 mmol) in pyridine (20 mL) was stirred for 18 h at room temperature. The reaction mixture was concentrated and the residue was purified by prep. TLC (DCM/MeOH=15/1) to give 3 (210 mg, 50.6%). Chemical Formula: $C_{14}H_{18}ClN_3O_3$; Molecular Weight: 311.77; LCMS: (ES+): m/z 312.1, 314.1 $[M+1]^+$, $t_R$=3.26 min.

Step 3: 3-(8-chloroimidazo[1,5-a]pyrazin-3-yl)cyclohexyl acetate (4)

To a mixture of 3 (210 mg, 0.67 mmol) and DMF (49 mg, 0.67 mmol) in ACN (10 mL) was added $POCl_3$ (410 mg, 2.68 mmol) and stirred for 3 h at room temperature. The reaction mixture was quenched with sat. $NaHCO_3$ to pH=10, extracted with EA. The organic phase was washed with brine, dried over $Na_2SO_4$, filtered, and the filtrate was concentrated to give 4 (180 mg, 91.4%). 1H NMR (400 MHz, $CDCl_3$): δ 7.79 (s, 1H), 7.61 (d, J=4.8 Hz, 1H), 7.33 (d, J=4.8 Hz, 1H), 5.28 (m, 1H), 2.08-2.15 (m, 4H), 1.88-2.04 (m, 4H), 1.62-1.82 (m, 4H); Chemical Formula: $C_{14}H_{16}ClN_3O_2$; Molecular Weight: 293.75; LCMS: (ES+): m/z 294.1, 296.1 $[M+1]^+$, $t_R$=3.73 min.

Step 4: 3-(1-bromo-8-chloroimidazo[1,5-a]pyrazin-3-yl)cyclohexyl acetate (5)

To a mixture of 4 (180 mg, 0.61 mmol) in THF (10 mL) was added NBS (109 mg, 0.61 mmol) and stirred for 1 h at room temperature. The reaction mixture was quenched with water, extracted with EA. The organic phase was washed with brine, dried over $Na_2SO_4$, filtered, the filtrate was concentrated and the residue was purified by prep. TLC (DCM/MeOH=15/1) to give 5 (205 mg, 89.5%); Chemical Formula: $C_{14}H_{15}BrClN_3O_2$; Molecular Weight: 372.65; LCMS: (ES+): m/z 372.0, 374.0 [M+1]$^+$, $t_R$=4.32 min.

Step 5: 3-(8-amino-1-bromoimidazo[1,5-a]pyrazin-3-yl)cyclohexanol (6)

A mixture of 5 (205 mg, 0.55 mmol) in 85% of $NH_3$ (5 mL) and i-PrOH (5 mL) was heated to 110° C. and stirred for 6 h and then cooled to room temperature. The reaction mixture was concentrated and the residue was dissolved in EA and washed with brine, dried over $Na_2SO_4$, filtered, the filtrate was concentrated to give 6 (145 mg, 84.8%). Chemical Formula: $C_{12}H_{15}BrN_4O$; Molecular Weight: 311.18; LCMS: (ES+): m/z 311, 313 [M+1]$^+$, $t_R$=2.39 min.

Step 6: 3-(8-amino-1-(4-phenoxyphenyl)imidazo[1,5-a]pyrazin-3-yl)cyclohexanol (7)

A mixture of 6 (70 mg, 0.23 mmol), (4-phenoxyphenyl)boronic acid (96 mg, 0.45 mmol), Pd(dppf)Cl$_2$·CH$_2$Cl$_2$ (19 mg, 0.023 mmol) and K$_2$CO$_3$ (62 mg, 0.45 mmol) in dioxane (10 mL) and water (2 mL) was heated to 100° C. and stirred for 5 h under N$_2$ and then cooled to room temperature. The reaction mixture was filtered and the filtrate was concentrated. The residue was purified by prep. HPLC to 7 (30 mg, 32.6%). $^1$H NMR (400 MHz, d$^3$-MeOD): δ 7.59-7.61 (m, 3H), 7.41 (t, J=7.6 Hz, 2H), 7.17 (d, J=7.6 Hz, 1H), 7.13 (d, J=7.6 Hz, 2H), 7.09 (d, J=7.6 Hz, 2H), 6.99 (d, J=4.8 Hz, 1H), 4.22 (m, 1H), 3.54-3.60 (m, 1H), 1.91-2.04 (m, 4H), 1.74-1.82 (m, 2H), 1.59-1.71 (m, 2H); Chemical Formula: $C_{24}H_{24}N_4O_2$; Molecular Weight: 400.48; LCMS: (ES+): m/z 401.2 [M+1]$^+$, $t_R$=3.22 min.

Example 2

4-{8-Amino-1-[4-(2-fluoro-3-methoxy-phenoxy)-phenyl]-imidazo[1,5-a]pyrazin-3-yl}-cyclohexanol

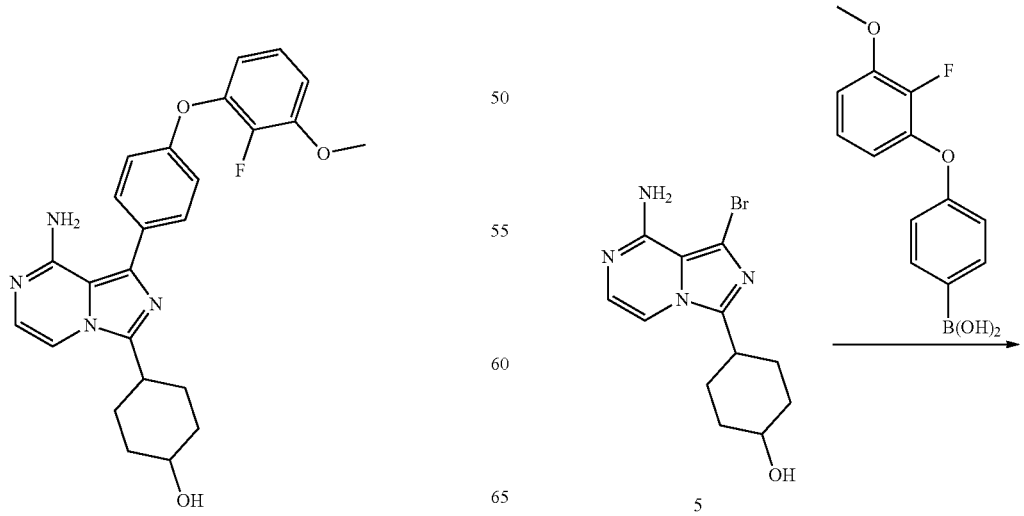

-continued

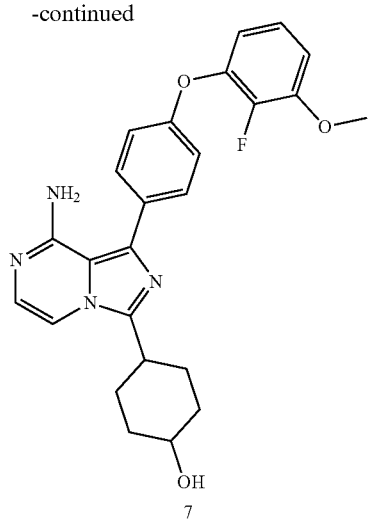

7

Step 1: 4-(((3-chloropyrazin-2-yl)methyl)carbamoyl)cyclohexyl acetate (2)

To a mixture of 4-acetoxycyclohexane-1-carboxylic acid (207 mg, 1.11 mmol), (3-chloropyrazin-2-yl) methanamine hydrochloride (1) (200 mg, 1.11 mmol), HATU (422 mg, 1.11 mmol) in DCM (10 mL) was added TEA (449 mg, 4.44 mmol) dropwise at 0° C. After 30 min, the mixture was stirred at room temperature for 1 hours. The reaction mixture was quenched by water (20 mL) and extracted with DCM (20 mL×3). The combined organic layers were washed by 5% $Na_2CO_3$ (30 mL), brine (50 mL), dried over anhydrous sodium sulfate and filtered. The filtrate was concentrated under vacuum and purified by silica gel column chromatography (DCM/MeOH=200:1-50:1) to obtain product 2 (246 mg, yield 71%). $^1$H-NMR (400 MHz, $CDCl_3$): δ 8.46 (d, J=2.3 Hz, 1H), 8.34 (d, J=2.3 Hz, 1H), 6.84 (s, 1H), 4.77-4.63 (m, 3H), 2.80 (s, 1H), 2.39-2.20 (m, 1H), 2.14-2.08 (m, 1H), 2.06 (d, J=9.8 Hz, 5H), 2.00-1.90 (m, 1H), 1.87-1.77 (m, 1H), 1.60 (dd, J=12.6, 8.1 Hz, 1H), 1.44 (dd, J=19.0, 8.2 Hz, 1H).

Step 2: 4-(8-chloroimidazo[1,5-a]pyrazin-3-yl)cyclohexyl acetate (3)

To the solution of 2 (246 mg, 0.79 mmol) in MeCN (20 mL) and DMF (57 mg, 0.79 mmol) was added $POCl_3$ (483 mg, 3.15 mmol) dropwise under ice-water bath. The reaction mixture was stirred at room temperature for 2 hours. The reaction mixture was poured into the mixture of ice (20 g) and ammonia (10 mL) with pH=10. The mixture was extracted with DCM (30 mL×3) and the combined organic layers were washed with saturated $NaHCO_3$ (50 mL). water (50 mL) and brine (50 mL), dried over $Na_2SO_4$. The solvent was removed get crude 3 (230 mg, yield 95%). Chemical Formula: $C_{14}H_{16}ClN_3O_2$; Molecular Weight: 293.8. LCMS: (ES+): m/z 294.1, 296.2 $[M+1]^+$, $t_R$=1.98 min.

Step 3: 4-(1-bromo-8-chloroimidazo[1,5-a]pyrazin-3-yl)cyclohexyl acetate (4)

To the solution of 3 (230 mg, 0.78 mmol) in THF (10 mL) was added NBS (137 mg, 0.78 mmol) at 0° C. The mixture was stirred at 25° C. for 0.5 hour, then the mixture solution was diluted with water (50 mL) and extracted with EA (30 mL×3). The organic layer was washed with sodium bicarbonate (20 mL), water (20 mL) and brine (20 mL), dried over $Na_2SO_4$. The solvent was removed by rotary evaporation and purified by silica gel column chromatography (DCM/MeOH=100:1) obtain 4 (265 mg, yield 91%). 1HNMR (400 MHz, $CDCl_3$): δ 7.59 (dd, J=5.0, 2.2 Hz, 1H), 7.29 (d, J=5.0 Hz, 1H), 4.89-4.70 (m, 1H), 3.05-2.86 (m, 1H), 2.24-2.13 (m, 2H), 2.04 (d, J=6.3 Hz, 4H), 1.91 (d, J=14.0 Hz, 1H), 1.87-1.78 (m, 1H), 1.77-1.63 (m, 1H), 1.52 (dt, J=24.0, 6.5 Hz, 2H). Chemical Formula: $C_{14}H_{15}BrClN_3O_2$; Molecular Weight: 372.6; LCMS: (ES+): m/z 374.0 $[M+1]^+$, $t_R$=2.30 min.

Step 4: 4-(8-amino-1-bromoimidazo[1,5-a]pyrazin-3-yl)cyclohexan-1-ol (5)

To the mixture of 4 (265 mg, 0.71 mmol) in isopropyl alcohol (5 mL) was added ammonia solution (5.0 mL) in sealed tube, and the mixture was stirred at 80° C. for 5 hours. The mixture solution was evaporated and diluted with ethyl acetate (50 mL). The organic layer was washed with water (20 mL) and brine (20 mL), dried over $Na_2SO_4$. The solvent was removed and get crude 5 (160 mg, yield 72%). Chemical Formula: $C_{12}H_{15}BrN_4O$; Molecular Weight: 311.2; LCMS: (ES+): m/z 313.1 $[M+1]^+$, $t_R$=1.15 min.

Step 5: 4-(8-amino-1-(4-(2-fluoro-3-methoxyphenoxy)phenyl)imidazo[1,5-a]pyrazin-3-yl)cyclohexan-1-ol (6)

The mixture of 5 (90 mg, 0.29 mmol), (4-(2-fluoro-3-methoxyphenoxy)phenyl)-boronic acid (189 mg, 0.72 mmol), $PdCl_2$(dppf) (42 mg, 0.058 mmol), potassium carbonate (80 mg, 0.58 mmol) were combined in dioxane (5.0 mL) and water (1.0 mL). The reaction mixture was stirred reflux under Ar for 4 hours. Then the mixture was cooled to room temperature, filtrated, washed with EA (20 mL×3). The organic layer was washed with water (20 mL) and brine (20 mL), dried over $Na_2SO_4$. The solvent was removed and purified with Pre-TLC (50:1) to afford 6 (20 mg, yield 20%). 1HNMR (400 MHz, MeOD-$d_3$): δ 7.82 (d, J=6.0 Hz, 1H), 7.64 (d, J=8.7 Hz, 2H), 7.15 (dd, J=14.0, 5.3 Hz, 3H), 7.05-6.94 (m, 2H), 6.80 (dd, J=11.1, 4.1 Hz, 1H), 3.71-3.60 (m, 1H), 3.22-3.10 (m, 1H), 2.14-2.00 (m, 4H), 1.82 (dt, J=13.7, 6.9 Hz, 2H), 1.57-1.44 (m, 2H). Chemical Formula: $C_{25}H_{25}FN_4O_3$; Molecular Weight: 448.5; LCMS: (ES+): m/z 449.3 $[M+1]^+$, $t_R$=1.68 min.

Example 3

N-{4-[1-(3-Hydroxy-cyclohexyl)-1H-pyrazolo[4,3-c]pyridin-3-yl]-benzyl}-2-methoxy-benzamide

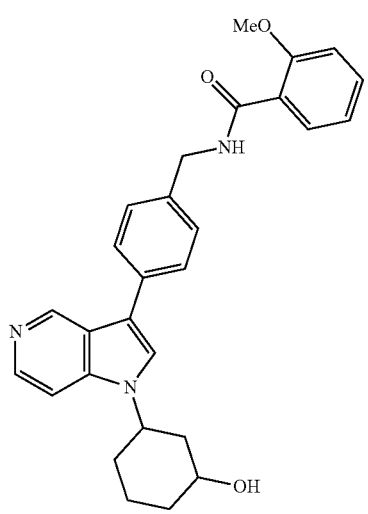 [SMILES: COc1ccccc1C(=O)NCc1ccc(-c2cn(C3CCCC(O)C3)c3ccncc23)cc1]

Reaction Scheme

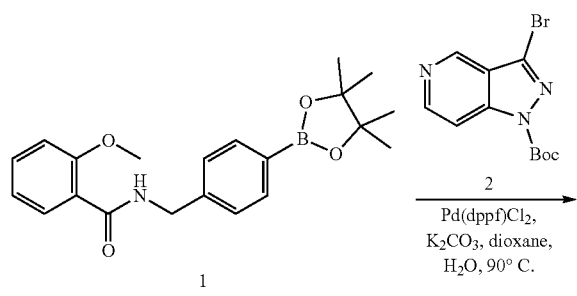

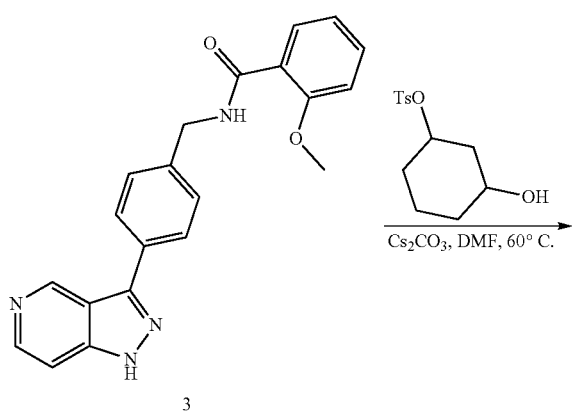

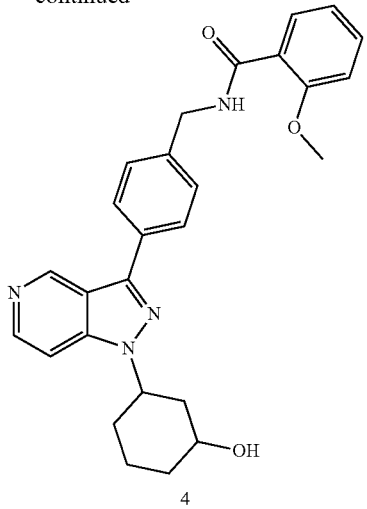

Step 1: N-(4-(1H-pyrazolo[4,3-c]pyridin-3-yl)benzyl)-2-methoxybenzamide (3)

The mixture of 2 (228 mg, 0.77 mmol), 2-methoxy-N-(4-(4,4,5,5-tetramethyl-1,3,2-dioxaborolan-2-yl)benzyl)benzamide (1, 620 mg, 1.69 mmol), PdCl$_2$(dppf) (56 mg, 0.077 mmol), potassium carbonate (212 mg, 1.54 mmol) were combined in dioxane (10 mL) and water (2.0 mL). The reaction mixture was stirred reflux under Ar for 8 hours. Then the mixture was cooled to room temperature, filtrated, washed with EA (20 mL×3). The organic layer was washed with water (20 mL) and brine (20 mL), dried over Na$_2$SO$_4$. The solvent was removed and purified with Prep-TLC to afford 3 (50 mg, yield 18%). 1H NMR (400 MHz, CDCl$_3$): δ 10.86 (s, 1H), 9.39 (s, 1H), 8.47 (d, J=5.4 Hz, 1H), 8.40-8.26 (m, 2H), 7.98 (d, J=7.6 Hz, 2H), 7.54 (d, J=7.8 Hz, 2H), 7.48 (t, J=7.6 Hz, 1H), 7.42 (d, J=5.5 Hz, 1H), 7.12 (t, J=7.6 Hz, 1H), 7.00 (d, J=8.4 Hz, 1H), 4.79 (d, J=5.5 Hz, 2H), 3.96 (s, 3H). Chemical Formula: C$_{21}$H$_{18}$N$_4$O$_2$; Molecular Weight: 358.4; LC-MS: (ES+): m/z 359.2 [M+H]$^+$. t$_R$=1.52 min.

Step 2: N-(4-(1-(3-hydroxycyclohexyl)-1H-pyrazolo[4,3-c]pyridin-3-yl)benzyl)-2-methoxybenzamide (4)

To the mixture of 3 (50 mg, 0.14 mmol), 3-hydroxycyclohexyl 4-methylbenzene-sulfonate (76 mg, 0.28 mmol) and Cs$_2$CO$_3$ (132 mg, 0.40 mmol) in DMF (5.0 mL) was stirred at 80° C. for overnight. Then the mixture was cooled to room temperature and quenched with water (10 mL). The mixture was extracted with ethyl acetate (20 mL×3). The combined organic layer was washed with brine (20 mL) and dried over anhydrous sodium sulfate. After filtration, the filtrate was concentrated under a reduced pressure and purified by Prep-TLC to afford 4 (6.0 mg, yield 2.8%). 1H NMR (400 MHz, MeOD): δ 9.29 (s, 1H), 8.35 (d, J=6.2 Hz, 1H), 8.00 (d, J=8.2 Hz, 2H), 7.92 (dd, J=7.7, 1.7 Hz, 1H), 7.71 (d, J=6.1 Hz, 1H), 7.56 (d, J=8.1 Hz, 2H), 7.54-7.47 (m, 1H), 7.16 (d, J=8.4 Hz, 1H), 7.07 (t, J=7.5 Hz, 1H), 4.71 (s, 2H), 3.98 (s, 3H), 3.89-3.75 (m, 1H), 2.31 (d, J=11.6 Hz, 1H), 2.02 (ddd, J=19.4, 18.2, 7.5 Hz, 5H), 1.67-1.51 (m, 1H), 1.43-1.32 (m, 1H). Chemical Formula: C$_{27}$H$_{28}$N$_4$O$_3$, Molecular Weight: 456.5. LC-MS: (ES+): m/z 457.2 [M+H]$^+$. t$_R$=1.62 min.

Examples 4 to 31 were prepared following the procedures described above from Examples 1 to 3:

| Entry | Structure | MS(cald.) [M + H]⁺/ MS (found) | Name |
|---|---|---|---|
| 4 | | 449.2 | (3-{8-Amino-1-[4-(2-fluoro-3-methoxy-phenoxy)-phenyl]-imidazo[1,5-a]pyrazin-3-yl}-cyclohexanol |
| 5 | | 401.2 | 4-[8-Amino-1-(4-phenoxy-phenyl)-imidazo[1,5-a]pyrazin-3-yl]-cyclohexanol |
| 6 | | 453.1 | 4-{8-Amino-1-[4-(3-chloro-2-fluoro-phenoxy)-phenyl]-imidazo[1,5-a]pyrazin-3-yl}-cyclohexanol |

-continued

| Entry | Structure | MS(cald.) [M + H]⁺/ MS (found) | Name |
|---|---|---|---|
| 7 | | 434.15 | 4-{8-Amino-1-[4-(3-chloro-phenoxy)-phenyl]-imidazo[1,5-a]pyrazin-3-yl}-cyclohexanol |
| 8 | | 414.21 | 4-[8-Amino-1-(4-m-tolyloxy-phenyl)-imidazo[1,5-a]pyrazin-3-yl]-cyclohexanol |
| 9 | | 445.2 | 4-{8-Amino-1-[4-(3-methoxy-2-methyl-phenoxy)-phenyl]-imidazo[1,5-a]pyrazin-3-yl}-cyclohexanol |

-continued

| Entry | Structure | MS(cald.) [M + H]+/ MS (found) | Name |
|---|---|---|---|
| 10 | | 456.22 | N-{4-[1-(4-Hydroxy-cyclohexyl)-1H-pyrazolo[4,3-c]pyridin-3-yl]-benzyl}-2-methoxy-benzamide |
| 11 | | 471.23 | N-{4-[8-Amino-3-(4-hydroxy-cyclohexyl)-imidazo[1,5-a]pyrazin-1-yl]-benzyl}-2-methoxy-benzamide |
| 12 | | 471.23 | N-{4-[8-Amino-3-(3-hydroxy-cyclohexyl)-imidazo[1,5-a]pyrazin-1-yl]-benzyl}-2-methoxy-benzamide |

| Entry | Structure | MS(cald.) [M + H]+/ MS (found) | Name |
|---|---|---|---|
| 13 | 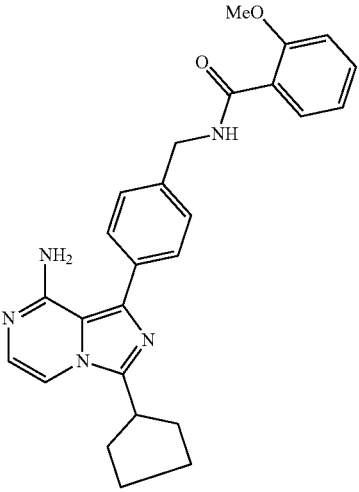 [SMILES: COc1ccccc1C(=O)NCc1ccc(-c2nc(C3CCCC3)n3ccnc(N)c23)cc1] | 441.22 | N-[4-(8-Amino-3-cyclopentyl-imidazo[1,5-a]pyrazin-1-yl)-benzyl]-2-methoxy-benzamide |
| 14 | 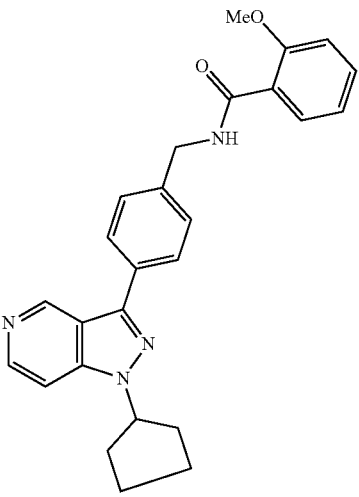 [SMILES: COc1ccccc1C(=O)NCc1ccc(-c2nn(C3CCCC3)c3ccncc23)cc1] | 426.21 | N-[4-(1-Cyclopentyl-1H-pyrazolo[4,3-c]pyridin-3-yl)-benzyl]-2-methoxy-benzamide |
| 15 | 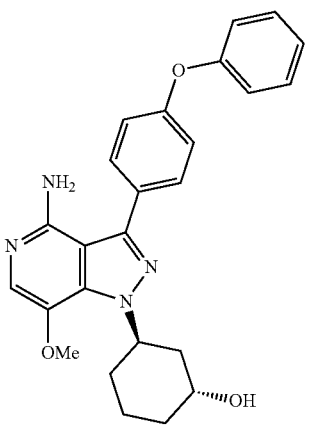 [SMILES: COc1cnc(N)c2c(-c3ccc(Oc4ccccc4)cc3)nn([C@@H]3CCC[C@@H](O)C3)c12] | 430.20 | 3-[4-Amino-7-methoxy-3-(4-phenoxy-phenyl)-pyrazolo[4,3-c]pyridin-1-yl]-cyclohexanol |

-continued

| Entry | Structure | MS(cald.) [M + H]+/ MS (found) | Name |
|---|---|---|---|
| 16 | | 430.20 | 4-[4-Amino-7-methoxy-3-(4-phenoxy-phenyl)-pyrazolo[4,3-c]pyridin-1-yl]-cyclohexanol |
| 17 | | 478.20 | 3-{4-Amino-3-[4-(2-fluoro-3-methoxy-phenoxy)-phenyl]-7-methoxy-pyrazolo[4,3-c]pyridin-1-yl}-cyclohexanol |
| 18 | | 478.20 | 4-{4-Amino-3-[4-(2-fluoro-3-methoxy-phenoxy)-phenyl]-7-methoxy-pyrazolo[4,3-c]pyridin-1-yl}-cyclohexanol |

-continued

| Entry | Structure | MS(cald.) [M + H]+/ MS (found) | Name |
|---|---|---|---|
| 19 | | 401.2 | 1-Cyclopentyl-7-methoxy-3-(4-phenoxy-phenyl)-1H-pyrazolo[4,3-c]pyridin-4-ylamine |
| 20 | | 493.2 | 3-{8-Amino-5-ethoxy-1-[4-(2-fluoro-3-methoxy-phenoxy)-phenyl]-imidazo[1,5-a]pyrazin-3-yl}-cyclohexanol |
| 21 | | 493.2 | 4-{8-Amino-5-ethoxy-1-[4-(2-fluoro-3-methoxy-phenoxy)-phenyl]-imidazo[1,5-a]pyrazin-3-yl}-cyclohexanol |

-continued

| Entry | Structure | MS(cald.) [M + H]+/ MS (found) | Name |
|---|---|---|---|
| 22 | | 445.2 | 4-[8-Amino-5-ethoxy-1-(4-phenoxy-phenyl)-imidazo[1,5-a]pyrazin-3-yl]-cyclohexanol |
| 23 | | 429.2 | 3-Cyclohexyl-5-ethoxy-1-(4-phenoxy-phenyl)-imidazo[1,5-a]pyrazin-8-ylamine |
| 24 | | 463.2 | 3-Cyclopentyl-5-ethoxy-1-[4-(2-fluoro-3-methoxy-phenoxy)-phenyl]-imidazo[1,5-a]pyrazin-8-ylamine |

-continued

| Entry | Structure | MS(cald.) [M + H]⁺/ MS (found) | Name |
|---|---|---|---|
| 25 | | 516.2 | N-{4-[8-Amino-5-ethoxy-3-(4-hydroxy-cyclohexyl)-imidazo[1,5-a]pyrazin-1-yl]-benzyl}-2-methoxy-benzamide |
| 26 | | 500.2 | N-[4-(8-Amino-3-cyclohexyl-5-ethoxy-imidazo[1,5-a]pyrazin-1-yl)-benzyl]-2-methoxy-benzamide |
| 27 | | 486.2 | N-[4-(8-Amino-3-cyclopentyl-5-ethoxy-imidazo[1,5-a]pyrazin-1-yl)-benzyl]-2-methoxy-benzamide |

-continued

| Entry | Structure | MS(cald.) [M + H]+/ MS (found) | Name |
|---|---|---|---|
| 28 | | 431.2 | 5-Ethoxy-1-(4-phenoxy-phenyl)-3-(tetrahydro-pyran-4-yl)-imidazo[1,5-a]pyrazin-8-ylamine |
| 29 | | 429.2 | 3-[8-Amino-1-(4-phenoxy-phenyl)-imidazo[1,5-a]pyrazin-3-yl]-cyclohexanecarboxylic acid |
| 30 | | 528.2 | 4-(8-Amino-1-{4-[(2-methoxy-benzoylamino)-methyl]-phenyl}-imidazo[1,5-a]pyrazin-3-yl)-cyclohexanecarboxylic acid ethyl ester |

-continued

| Entry | Structure | MS(cald.) [M + H]+/ MS (found) | Name |
|---|---|---|---|
| 31 | (structure shown) | 486.2 | N-{4-[8-Amino-3-(4-methoxy-cyclohexyl)-imidazo[1,5-a]pyrazin-1-yl]-benzyl}-2-methoxy-benzamide |

BTK Kinase Assay

The BTK assay is performed using the BTK Kinase Enzyme System (Promega; Catalog #: V2941) and ADP-Glo™ Kinase Assay kit (Promega; Catalog #: V9101). Measurement were performed in a reaction volume of 5 μL using 384-well assay plate (Corning; Catalog #: 3570). 6 ng BTK enzyme, inhibitor or 1% DMSO, 1 μg Poly(Glu$_4$, Tyr$_1$) peptide, and 50 μM ATP were incubated in a reaction buffer composed of 40 mM Tris-Cl (pH7.5), 20 mM MgCl$_2$, 0.1 mg/mL BSA, 50 μM DTT and 2 mM MnCl$_2$ for one hour. ADP was detected as described in ADP-Glo™ Kinase Assay kit using 5 μl of ADP-Glo™ Reagent and 10 μl of Kinase Detection Reagent. Luminescence was recorded using a multimode plate reader (EnVision® Multilabel Reader, Perkin Elmer). There is a linear relationship between the luminescent signal and the amount of ADP in the reaction buffer. For each compound, enzyme activity was measured at various concentrations of compound, Negative control reactions were performed in the absence of inhibitor in three replicates and six no enzyme controls were used to determine baseline luminescence levels. Dose response curve were generated to determine the concentration required for IC$_{50}$ of BTK activity.

Example 32

The following Table shows the activity of selected compounds of this invention in the BTK inhibition assay. The compound numbers correspond to the compound numbers in previous Tables. Compounds having an activity designated as "A" provided an IC 50≤10 nM; Compounds having an activity designated as "B" provided an IC$_{50}$ 10-100 nM; Compounds having an activity designated as "C" provided an IC$_{50}$ 100-1000 nM; Compounds having an activity designated as "D" provided an IC$_{50}$ 1000-10000 nM; Compounds having an activity designated as "E" provided an IC$_{50}$≥10000 nM.

| Compound # | BTK Inhibition | Compound # | BTK Inhibition | Compound # | BTK Inhibition | Compound # | BTK Inhibition |
|---|---|---|---|---|---|---|---|
| 1 | A | 2 | A | 3 | N/A | 4 | A |
| 5 | A | 6 | A | 7 | B | 8 | A |
| 9 | B | 10 | N/A | 11 | A | 12 | N/A |
| 13 | N/A | 14 | N/A | 15 | N/A | 16 | N/A |
| 17 | N/A | 18 | N/A | 19 | N/A | 20 | N/A |
| 21 | N/A | 22 | N/A | 23 | N/A | 24 | N/A |
| 25 | N/A | 26 | N/A | 27 | N/A | 28 | N/A |
| 29 | N/A | 30 | N/A | 31 | N/A | | |

What is claimed is:

1. A compound of Formula (I) or (II) having the following structure, a tautomer thereof, a pharmaceutical acceptable solvate thereof, or a pharmaceutical acceptable prodrug thereof:

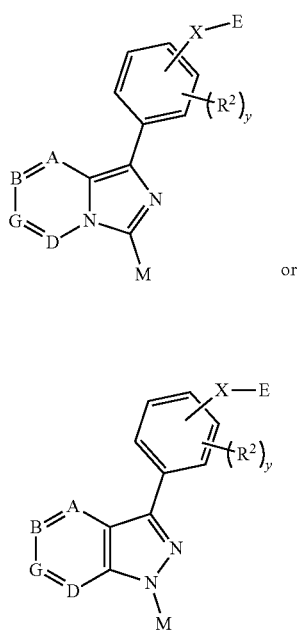
(I)
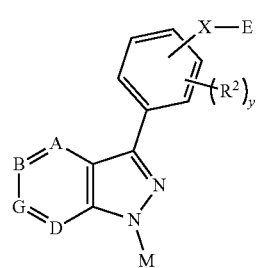
(II)
wherein:
A is C(NH₂) or CH, B is N, G is CH, and D is CH;
R² is independently hydrogen, and y is an integer from 0 to 5; and y is an integer from 0 to 5;
M is
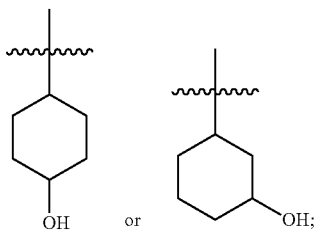 [SMILES: *C1CCC(O)CC1 ; *C1CCCC(O)C1]
X is —O— or —CH₂—NH—CO—; and
E is
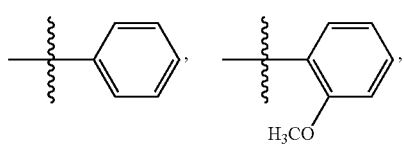
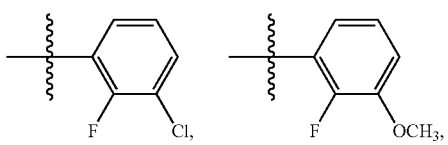
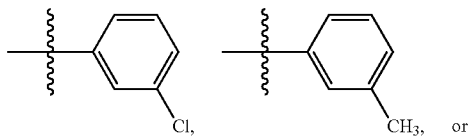
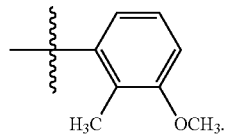
2. The compound of claim 1, wherein the compound is selected from the group consisting of
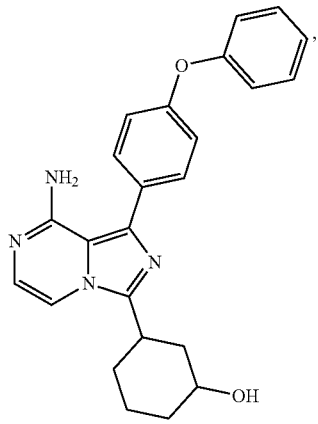
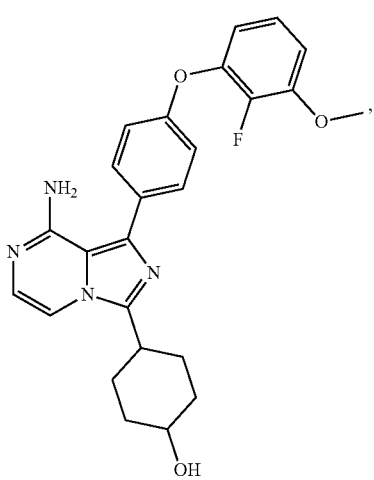

43
-continued
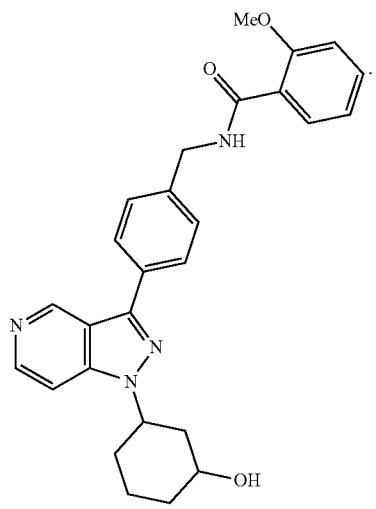 [SMILES: COc1ccccc1C(=O)NCc1ccc(-c2nc(C3CCCC(O)C3)n3ccnc(N)c23)cc1]
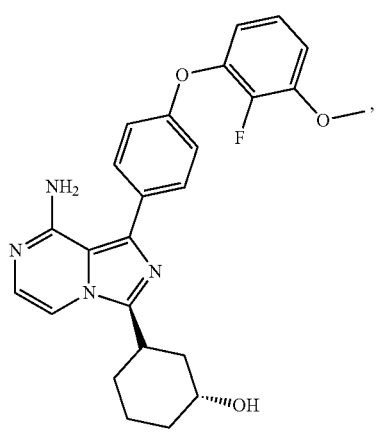
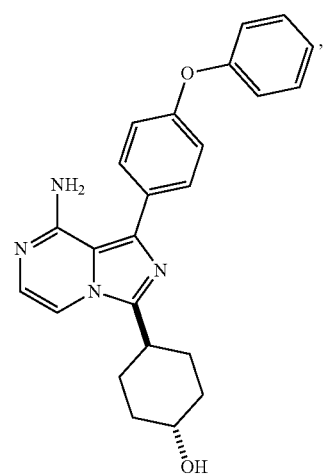
44
-continued
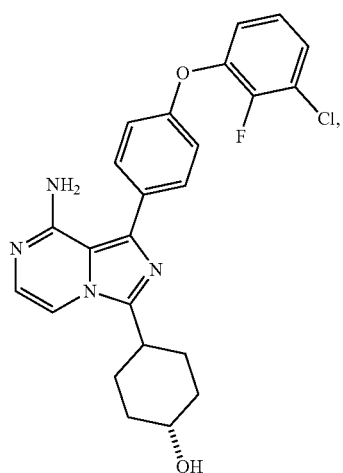
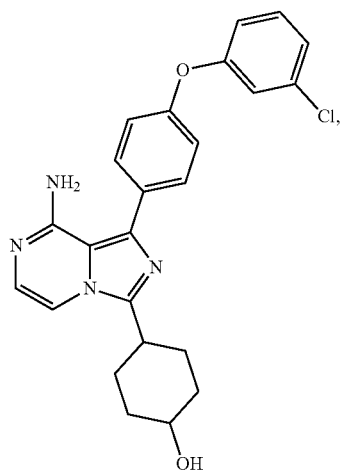
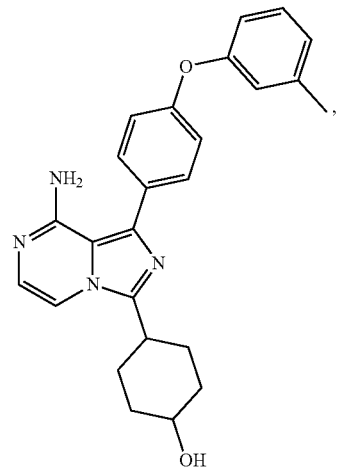

45
-continued
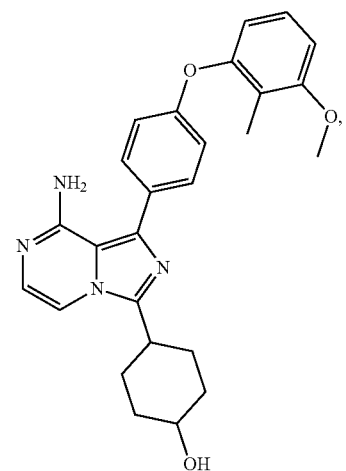
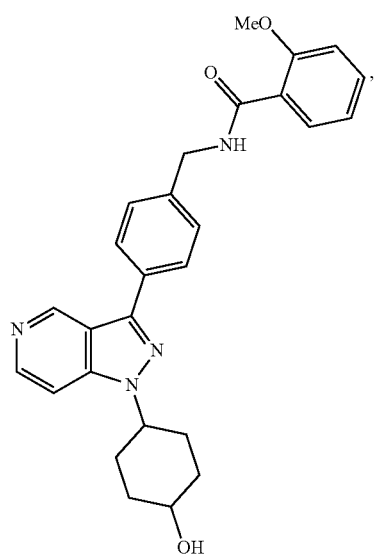
46
-continued
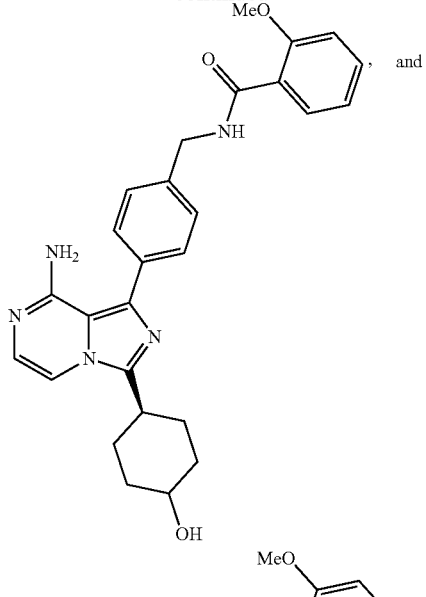, and
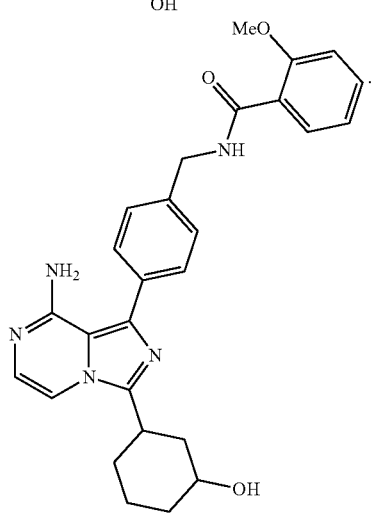.
* * * * *